March 9, 1943.          J. W. NEFF          2,313,476
PLASTIC MOLDING MACHINE
Filed Feb. 24, 1941          4 Sheets-Sheet 1

Inventor
John W. Neff
his Attorney

March 9, 1943. J. W. NEFF 2,313,476
PLASTIC MOLDING MACHINE
Filed Feb. 24, 1941  4 Sheets-Sheet 2
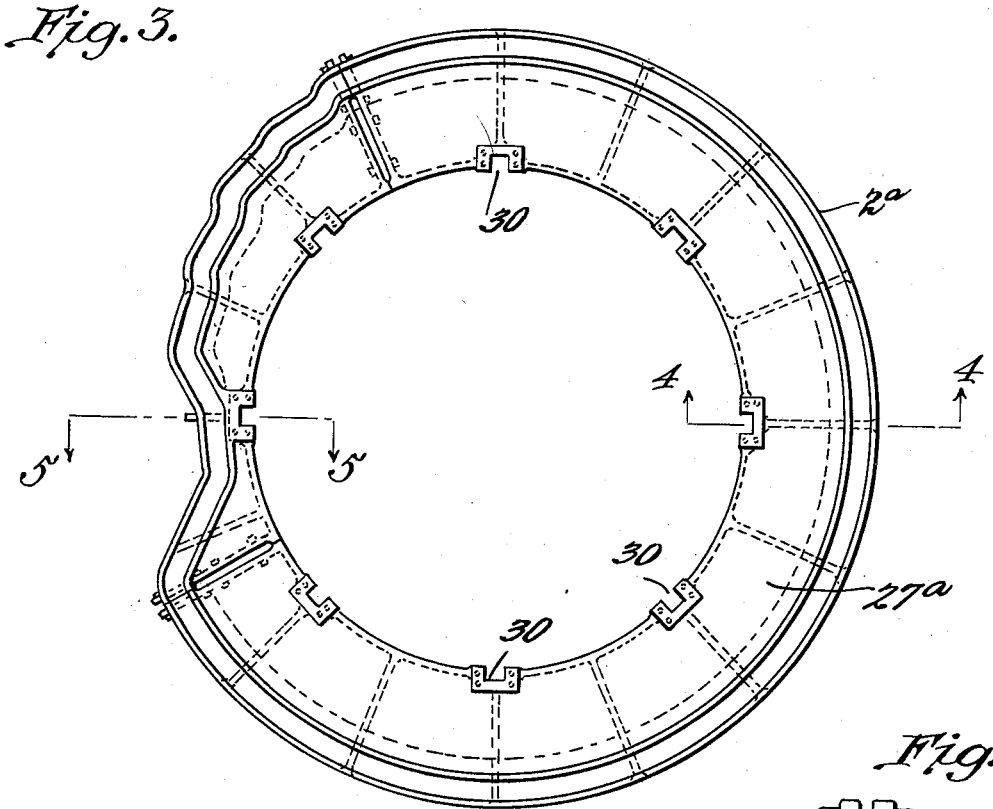
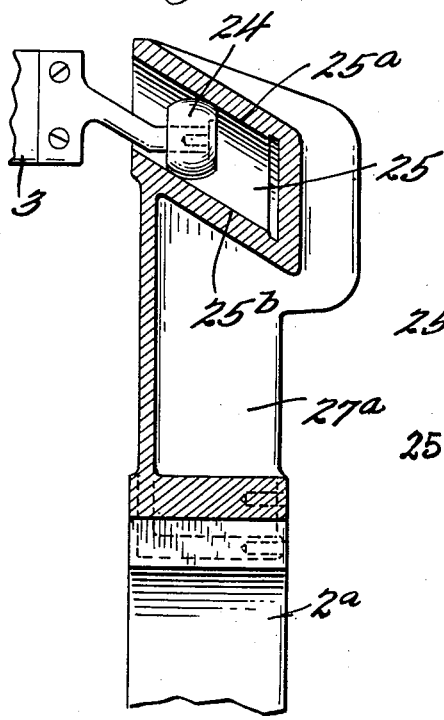
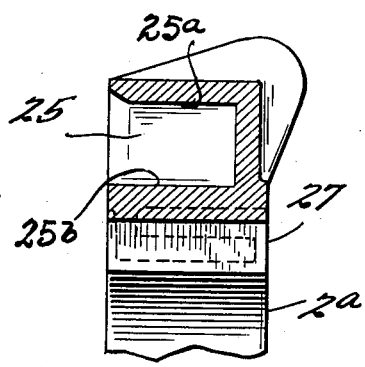
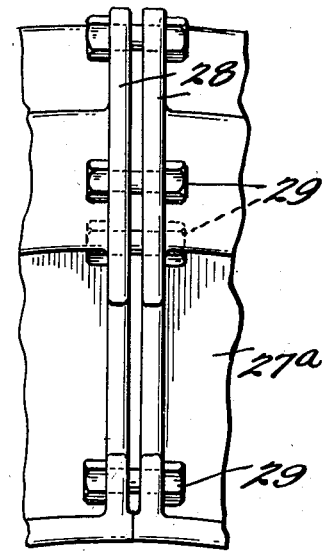
Inventor
John W. Neff
By Eugene A. Purdy
His Attorney March 9, 1943.　　　J. W. NEFF　　　2,313,476
PLASTIC MOLDING MACHINE
Filed Feb. 24, 1941　　　4 Sheets-Sheet 3
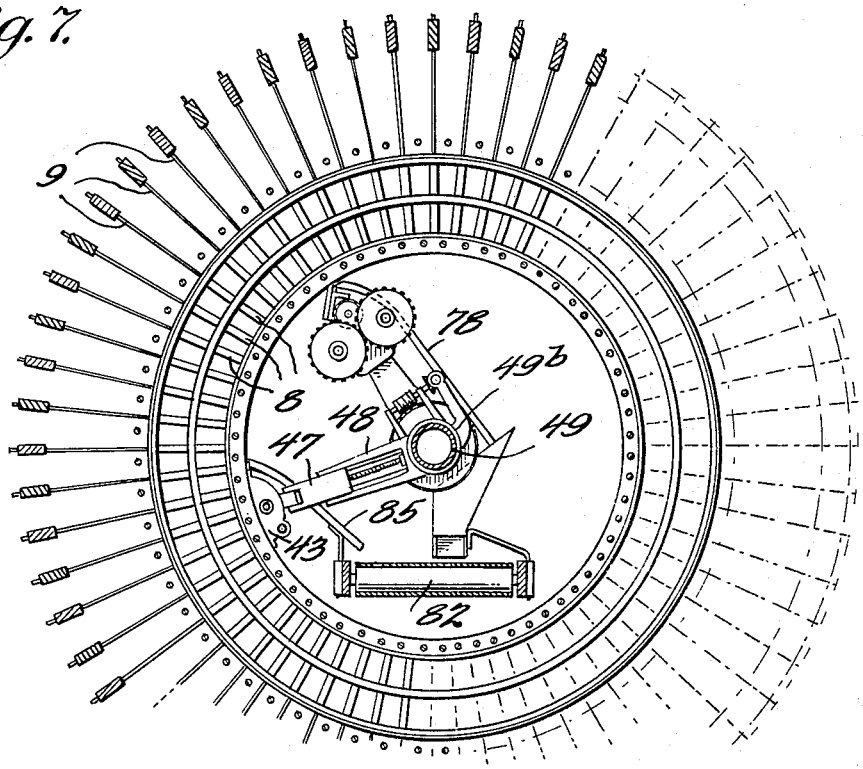
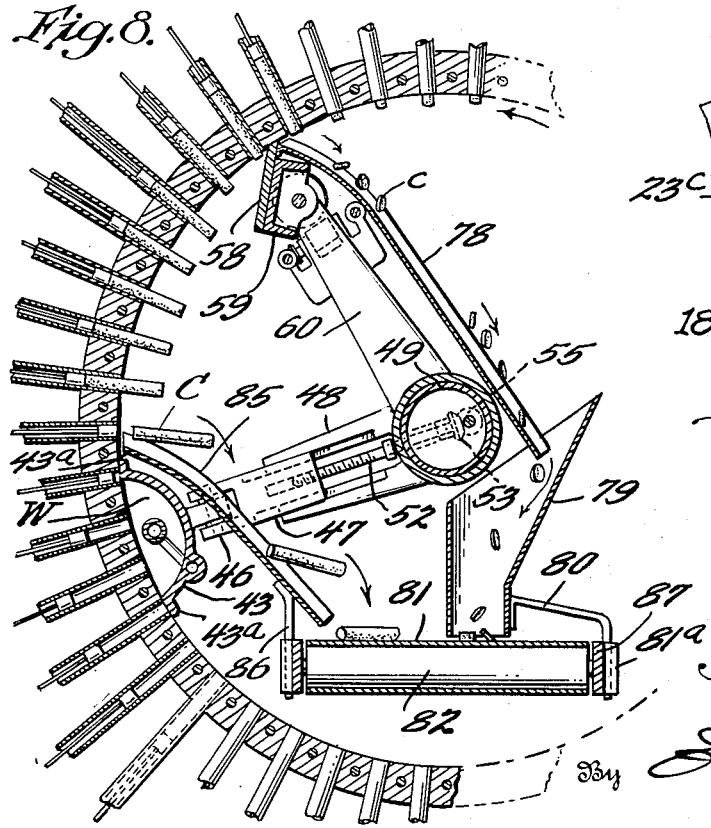
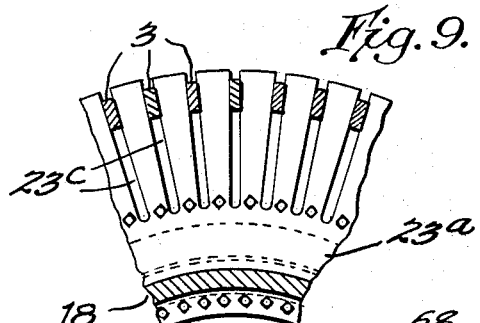
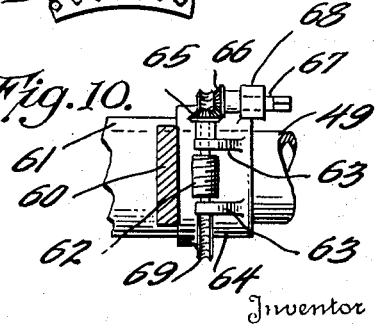
Inventor
John W. Neff
By Eugene A. Thomas
his Attorney

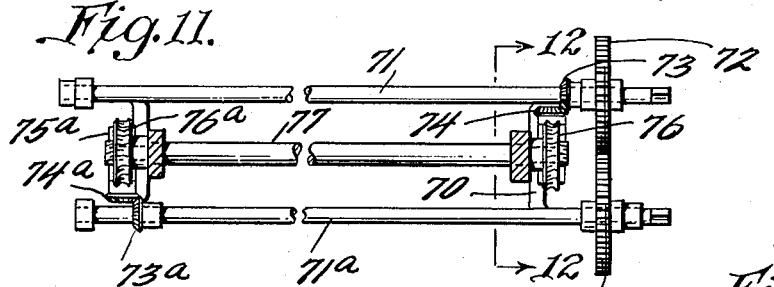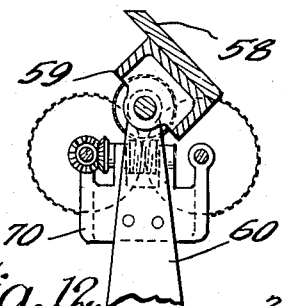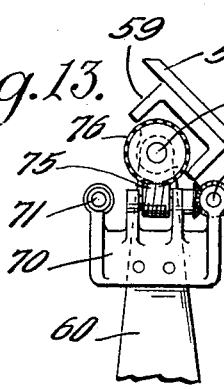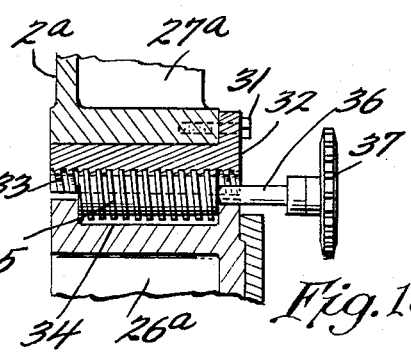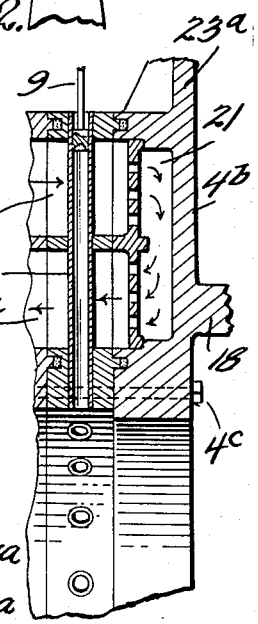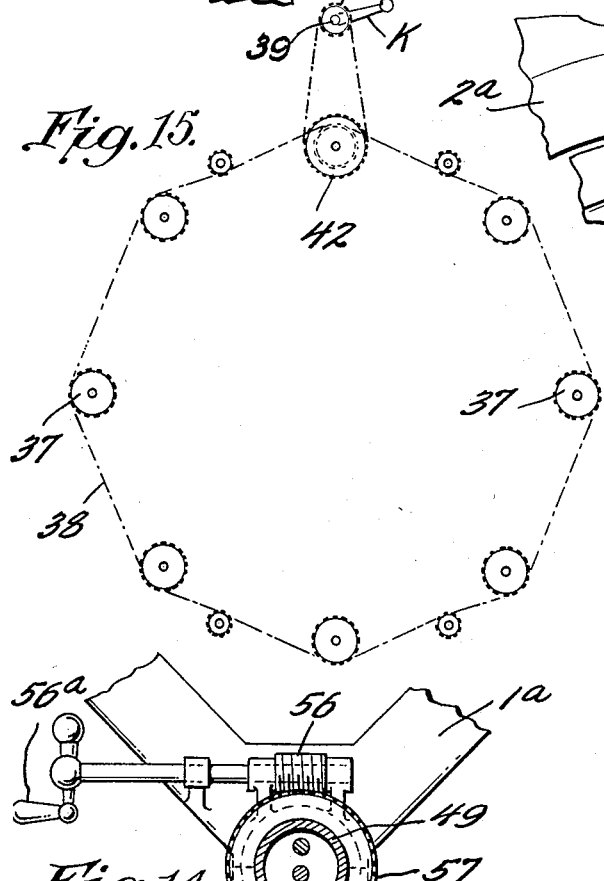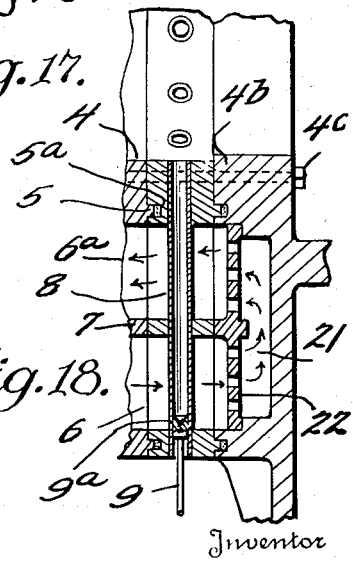

Patented Mar. 9, 1943

2,313,476

UNITED STATES PATENT OFFICE 2,313,476

PLASTIC MOLDING MACHINE

John W. Neff, Easton, Pa., assignor to Binney and Smith Company, New York, N. Y., a corporation of New Jersey Application February 24, 1941, Serial No. 380,373

14 Claims. (Cl. 18—28)

This invention relates to machines for continuously molding shapes from plastic material, and more particularly to that type of machine in which a series of tubular molds are mounted upon a rotary carrier, molten material being introduced into the molds at one position of the carrier and the hardened sticks of material being ejected therefrom at another position of the carrier.

An important object of the invention is to provide in a rotary molding machine of the above character means for casting sticks of material of any desired length, within reasonable limits. In the preferred form of the invention this is accomplished by providing plungers for projecting the cast sticks from the molds in a step-by-step movement and a knife circumferentially adjustable to different positions about the mold carrier for trimming off the projecting ends of the sticks so as to thereby determine the length of the sticks finally ejected from the molds.

Another object of the invention is to provide in a rotary molding machine of the above character laterally adjustable cam means for controlling the operation of the plungers, the cam means being so constructed and arranged as to permit of selectively and accurately raising or lowering the working range of the plungers without changing their sequence of operation. The track cam shown and described in this application forms the subject of my copending application Serial No. 442,244, filed May 8, 1942.

A further object of the invention is to provide in a rotary molding machine of the above character, means for circumferentially adjusting the position of the filling chamber about the carrier.

Still another object of the invention is to provide in a continuous molding machine of the above character, means for heating the material within the filling chamber so as to maintain it in a fluid condition, and means for cooling the molds to accelerate the solidification of the material during the travel of the molds from filling to discharge positions.

The invention has as another object to provide in a continuous molding machine of the above character, means for pivotally supporting the knife and means for adjusting its operating angle with respect to the mold carrier and for retaining it in fixed position free of play.

As still another object, the invention has for an object to provide a rotary molding machine of comparatively simple construction and capable of ready assembly or disassembly, whereby the machine may be conveniently and economically shipped in knock-down condition and set up at the place of intended use.

Other objects and advantages will be apparent from the following detailed description of a preferred embodiment of the invention, reference being had to the annexed drawings in which:

Figure 3 shows in full face view one of the cam rings for actuating the plungers;

Figure 4 is a transverse cross-sectional view of the cam ring taken on the line 4—4 of Fig. 3 and showing the cam track;

Figure 5 is a transverse cross-sectional view of the cam ring taken on the line 5—5 of Fig. 3;

Figure 6 is a detail view of the outer face of the cam ring showing the manner in which its arcuate sections are held together;

Figure 7 is a transverse cross-sectional view through part of the molding machine taken on the line 7—7 of Fig. 1, but showing the wax supply chamber and trimming knife in approximately the position they will occupy in usual practice;

Figure 8 is a transverse cross-sectional view similar to Fig. 7 through part of the molding machine taken on the line 8—8 of Fig. 1;

Figure 9 is a fragmentary cross-sectional view of the molding machine taken on the line 9—9 of Fig. 1, showing the manner in which the plunger-operating follower bars are mounted for movement within guide slots;

Figure 10 is a detail view of the means for adjusting the position of the trimming knife about the inner circumference of the mold carrier;

Figure 11 is a plan view of the counter-shafts and gearing for tensioning and for adjusting the operating angle of the trimming knife;

Figure 12 is a transverse cross-sectional view through the trimming knife, carrier bar and counter-shafts, taken on the line 12—12 of Fig. 11;

Figure 13 shows the trimming knife, carrier bar and counter-shafts viewed from the left-hand end of Fig. 11;

Figure 14 is a fragmentary cross-sectional view on the line 14—14 of Fig. 1 showing the worm and worm wheel for manually adjusting the position of the wax supply chamber with respect to the mold carrier;

Figure 15 is a sketch diagrammatically showing the chain drive for simultaneously adjusting the cam rings to and from each other;

Figure 16 is a transverse cross-sectional view through a cam ring showing one of the cam-adjusting screws;

Figure 17 is a fragmentary face view of a track cam showing the cam-adjusting screw viewed from the left-hand side of Fig. 16; and Figure 18 is a longitudinal cross-sectional view through the right-hand or "open" end of the mold carrier, corresponding to Fig. 1 but on a slightly larger scale.

Figure 1:
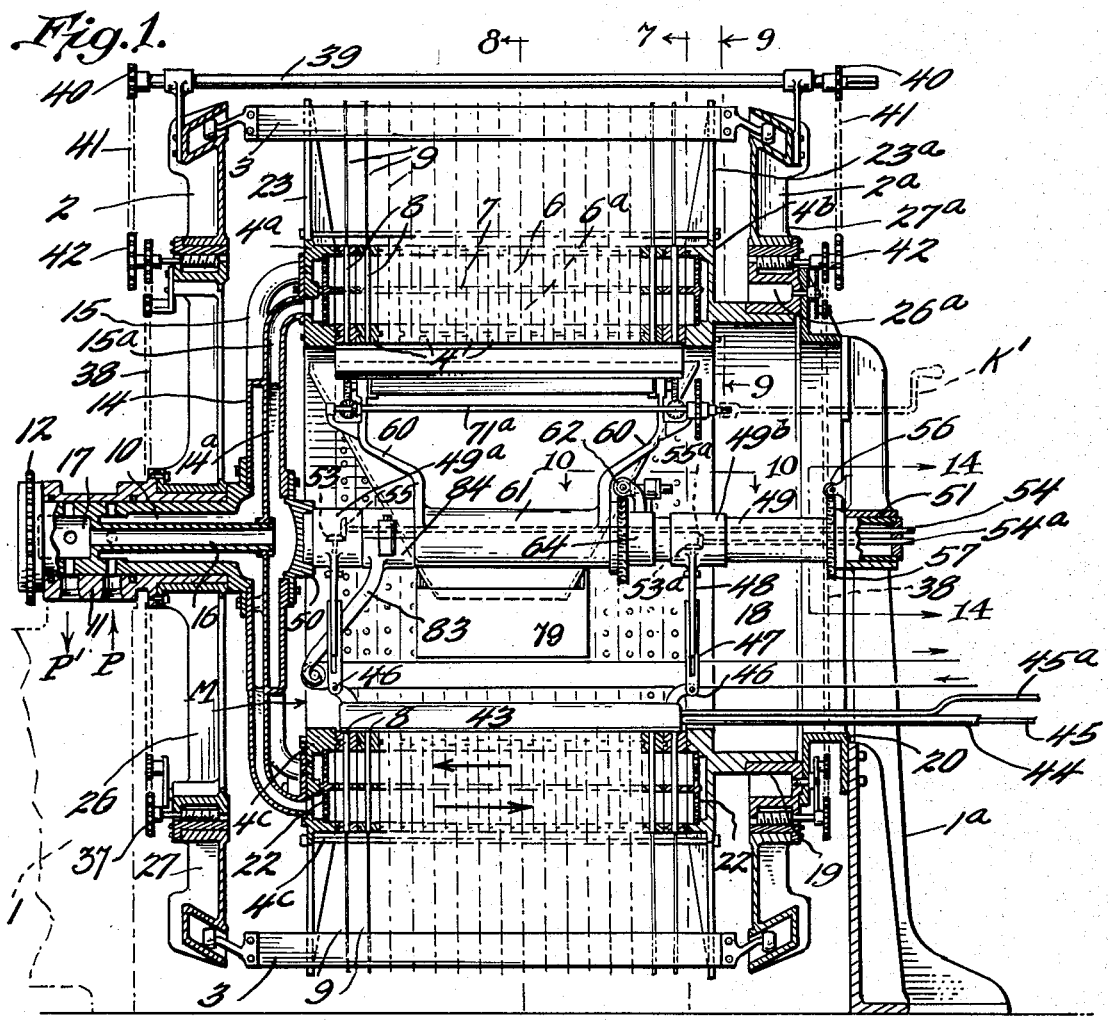
Figure 1 is a longitudinal cross-sectional view through a rotary molding machine designed for producing wax crayons, the wax supply chamber and trimming knife being shown, in the interest of greater clearness, as spaced apart through an angle of 180 degrees.

In the drawings is illustrated a continuous rotary molding machine adapted for casting sticks of wax crayons. This machine in general comprises a cylindrical mold carrier M, supported for rotation in stanchions 1 and 1a, a pair of stationary track cams 2 and 2a located adjacent opposite ends of the mold carrier and plunger-actuating means, including follower bars 3 extending between the cams and riding within their tracks during rotation of the mold carrier for ejecting the sticks of crayon from the molds.

The mold carrier, as best shown in Figs. 1 and 18 is composed of a series of mold rings 4 arranged side-by-side in abutting relation and clamped together by tie-rods 4c. One of the side faces of each ring presents a plurality of annular ribs 5 (Fig. 18) received within complementary annular recesses 5a formed upon the opposed face of an adjacent ring and containing a suitable sealing material so as to provide a fluid-tight interfit between the rings. Each ring is recessed at closely spaced circumferential intervals so as to form two passageways 6 and 6a extending through the ring and separated by a partition 7. End rings 4a and 4b close the passageways at opposite ends of the mold carrier. Arranged radially and in circumferentially spaced relation about each ring is a series of cylindrical molds 8 each opening through the outer and inner circumferences of the rings. The molds thus extend in parallel rows lengthwise of the mold carrier. Reciprocable within each mold is a plunger 9, its outer end projecting outwardly beyond the mold and being connected to one of the follower bars 3.

The left-hand side of the mold carrier, as viewed in Fig. 1, is supported by a hollow trunnion 10 which is journaled for rotation within a bearing 11 mounted upon the top of the stanchion 1. A sprocket 12 secured to the trunnion provides a driving connection for a transmission chain leading from a suitable source of power (not shown). At its end located inwardly of the cam 2 the hollow trunnion 10 is bolted to a flat cylindrical manifold providing a pair of circular water inlet and outlet compartments 14 and 14a, respectively, arranged side-by-side coaxially with the mold carrier. Leading radially off from each of these compartments, respectively, are distributor pipes 15 and 15a. These distributor pipes pass through openings suitably provided in the closing wall of the end ring 4a and communicate with the pairs of connected passageways 6 and 6a extending through the series of assembled mold rings. The end ring 4b, as best illustrated in Fig. 18, is formed with pockets 21 each closing the passageways 6 and 6a at the end of a row of molds and providing a channel connecting these passageways through which the cooling water after completing its travel through the passageway 6 is deflected into the adjacent end of return passageway 6a, as indicated by the arrows. These distributor pipes 15 and 15a permit the circulation of cooling water from the water inlet compartment 14 back and forth through the passageways 6 and 6a, being returned from passageway 6a to the outlet compartment 14a. An offtake conduit 16 disposed centrally within the hollow trunnion 10 and leading between the outlet compartment 14a and a vent chamber 17 located adjacent the outer end of the trunnion, affords means for removing the water after its passage through the mold carrier. Screens 22 are mounted in the end rings 4a and 4b in such manner as to intercept the stream of water flowing through the passageways 6 and 6a and smooth out the current. Conduits (not shown) connected to ports P and P' extending through the bearing 11 so as to communicate with the hollow trunnion 10 and the vent chamber 17, respectively, are suitably provided, the direction of flow being indicated by the arrows in Fig. 1.

The right-hand unobstructed or open end of the mold carrier (considered with reference to Fig. 1), is formed with a cylindrical flange 18 extending longitudinally outward from the end ring 4b. This flange is supported by and rotatable within a circular bearing 19 fixedly secured to the stanchion 1a through the intermediary of an annular casting 20.

Projecting circumferentially outward from the rings 4a and 4b at opposite ends of the mold carrier are flanges 23 and 23a radially slotted at circumferentially spaced intervals (Fig. 9) to provide guideways 23c for the follower bars 3. Each follower bar supports the outer ends of a row of plungers 9 associated with a row of molds 8. Upon the ends of the follower bars are rotatably mounted rollers 24 extending within tracks 25 (Figs. 4 and 5) formed upon the opposed faces of the track cams 2 and 2a. Track cam 2 is composed of two major parts, a central cam support 26 and an encircling and laterally shiftable cam ring 27; track cam 2a is similarly composed of a central cam support 26a integral with bearing 19 and a cam ring 27a (see Figs. 16 and 17). The tracks of the pair of cams are of a corresponding contour, this contour taking the form illustrated in Fig. 3. For the major portion A of its length, the track is concentric with the axis of rotation of the mold carrier and is most distantly located therefrom. Throughout a succeeding portion B the track slopes inwardly toward the axis in a series of concentric stepped sections ultimately attaining its closest approach to the axis where, throughout a short angular distance C, it extends concentrically with the cam. Thereafter the track for a portion D is inclined sharply upward and joins the concentric portion A, thus completing its contour.

Figure 2:
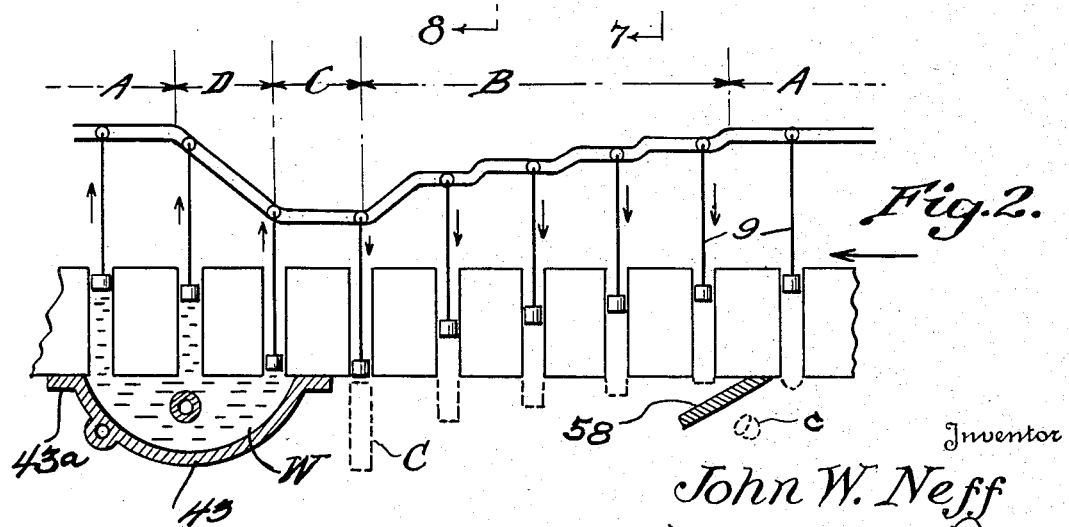
Figure 2 is a sketch illustrating schematically the action of the plungers in urging the sticks of crayon from the molds.

A lineal development of a cam track showing the action of the plungers 9 by virtue of the movement imparted to the follower bars 3, is schematically represented in Fig. 2. During rotation of the mold carrier M throughout that part of its circle of travel corresponding to the portion A of the cam tracks, each plunger 9 of the row of plungers connected with a follower bar is sustained in its fully retracted position. As the follower bar moves through an angle corresponding to the portion B of the cam tracks, the plunger is moved radially inward in an interrupted movement so as to progressively project the cast crayon stick from the mold. Then there is a short period of dwell as the mold carrier moves through the portion C. Continued movement of the mold carrier throughout an arc corresponding to the portion D of the cam tracks, causes the plunger to be continuously retracted. The plunger preferably has its inner working face so shaped as to form a tapered end upon the crayons produced therein, as indicated at 9a in Fig. 18.

The cam ring of each cam is composed of a plurality of arcuate sections fastened together in the manner indicated in Fig. 6. Adjacent its ends upon the outer face of each cam segment (that is, upon its face opposite to that through which the cam track opens) are provided flanges 28, the opposed flanges upon adjacent ends of contiguous cam segments being clamped together by bolts 29 extending through openings in these flanges. By reason of this sectional cam construction, the cams may be conveniently shipped in knock-down condition, while worn or damaged sections may be quickly replaced by new ones as occasion requires.

The cam tracks, at least throughout the major portion of their length, are disposed on a slope, as indicated in Fig. 4. That is the upper and lower walls 25a and 25b of the track are transversely inclined so that when the cam rings are shifted toward and from each other the rollers 24 supporting the ends of a follower bar are caused to engage higher or lower points upon the tracks. By laterally varying the position of the cams the sequence or pattern of operation of the plungers remains unchanged, although the location of the plungers with respect to their molds for corresponding positions of the mold carrier is altered—that is, the working range of the plungers is raised or lowered. In order, however, that the plungers will not be projected beyond the inner ends of the molds in any position of adjustment of the cams, the walls 25a and 25b of the arcuate portion C of the tracks, representing the maximum approach of the rollers toward the axis of rotation of the mold carrier, are made horizontal or level, as indicated in Fig. 5. Likewise the walls of the portion D of the cam tracks leading from the innermost to the outermost circular contours of the tracks are made horizontal so as to insure the complete retraction of the plungers throughout virtually the same arc of rotation of the mold carrier regardless of the position of adjustment of the cams.

The transverse slope or pitch of the walls of the tracks of both cams is equal and uniform, and in order to insure the proper operation of the plungers supported by the follower bars it is necessary that the adjustments of the cams toward and from each other should occur simultaneously and in equal increments of movement so as to maintain the follower bars horizontal in any position of adjustment of the cams. To accomplish this, the inner circumference of each cam ring is notched, as indicated at 30, at angularly spaced intervals (Fig. 3) and fitted within each notch and secured in place by bolts 31 are blocks 32 (Fig. 16) having a screw-threaded, semi-cylindrical recess 33. The cam support of each cam is likewise provided, at points corresponding to the notches 30 on the cam rings, with clearance recesses 34, in each of which there is rotatably mounted a worm 35 engaging the threads of the block 32. Each worm has a stem 36 extending from the clearance recess to the outer face of the cam and upon the end of the stem is fixed a sprocket 37. As schematically represented in Fig. 15, a chain 38 winds over all the series of sprockets connected with the worms associated with each of the cams 2 and 2a located at opposite ends of the machine. For driving these chains a common operating bar 39 extends horizontally above the machine, and this operating bar carries sprockets 40 which are respectively connected through chains 41 with sprockets 42 paired upon two of the stems 36 with sprockets 37. By connecting a hand-crank K to a squared end of the operating bar 39 (Fig. 15), this shaft may be rotated to likewise rotate, through the transmission chains just described, all the worms 35 for simultaneously shifting the cam rings toward or from each other, it being understood that the worms 35 upon opposite sides of the machine are oppositely threaded in order to accomplish this purpose.

Mounted within the interior of the mold carrier is a hollow shoe 43 (Figs. 7 and 8) forming a wax supply or filling chamber W having its bottom closed against the inner circumference of the mold carrier. Wax is introduced into this supply chamber in a hot, fluid state and under pressure from a communicating supply pipe 44 leading horizontally from a suitable wax reservoir (not shown) through the open end of the mold carrier (see Fig. 1). For maintaining the wax in a molten condition, a steam circulating pipe having its inlet and outlet sections 45 and 45a, respectively, passing through the open end of the mold traverses the interior of the supply chamber. The inlet section 45 extends interiorly within the wax supply pipe 44 for heating the wax during its travel from the wax reservoir to the supply chamber. The wax supply pipe and the steam circulating pipe are flexibly connected beyond the open end of the mold carrier for allowing adjustment of the shoe 43 to different angular positions, as will later be explained. The shoe 43 is formed with a lip 43a adjacent its margins so as to provide solid and tight bearing contact with the inner circumferences of the mold rings 4 during rotation of the mold carrier.

It is necessary to maintain firm pressure between the shoe and mold rings in order to avoid leakage of the wax from the shoe. To accomplish this the shoe is connected by pivots 46 at its opposite ends to blocks 47 which in turn are slidably mounted upon guide legs 48. These guide legs extend radially from hubs 49a, 49b fixed adjacent opposite ends of the apparatus to a stationary horizontal sleeve 49 arranged coaxially with the mold carrier. This sleeve at one of its ends fits loosely within a socket 50 secured to the inner face of the water outlet compartment 14a, and at its other end telescopes within a bearing opening 51 provided in the stanchion 1a. Screws 52 are rotatably mounted in sleeve 49 and project outwardly therefrom longitudinally of the legs 48, their lower ends engaging threaded bores in the blocks 47. For rotating the screws to move the shoe downwardly into engagement with the mold rings, a pair of operating rods 54 and 54a extend horizontally through the sleeve 49 to a position beyond its open end, these rods having upon their inner ends bevel gears 55, 55a, each meshing respectively with companion bevel gears 53 and 53a secured upon the upper ends of the screws 52. Thus, by coupling a hand crank to the operating rod 54 or 54a, either end of the shoe may be tightened against the mold carrier.

The shoe 43, as indicated in Fig. 2, normally occupies a position spanning an arc including the operative portion D of the cams—that is, the portion of the cam tracks which causes retraction of the plungers. During such retraction, hot molten wax flows from the supply chamber W into a row of molds. In order to accurately position the shoe with reference to the operating cycle of the machine, the shoe is constructed so as to be adjustable angularly throughout a limited arc. To accomplish such angular adjustment, there is provided, as best illustrated in Fig. 14, a worm 56 rotatably mounted upon the stanchion 1a and engaging a worm wheel 57 encircling and secured to the sleeve 49. Thus, by rotating the worm 56 by means of a crank 56a upon the end of the worm, the latter will rotate the worm wheel 57 and sleeve 49 to swing the legs 48 and thereby adjust the shoe to different positions angularly of the mold carrier.

Within the mold carrier and located a short angular distance (approximately 40 degrees) in advance of the shoe 43, as indicated in Figs. 7 and 8, is a trimming knife 58. In Fig. 1 the shoe and trimming knife are shown as disposed in a common plane solely for the purpose of more clearly illustrating the relationship of the parts to the mold carrier and not their relationship to each other. This knife extends longitudinally of the mold carrier and lies close to its inner circumference. The knife is fastened to a carrier bar 59 which in turn is pivoted to the outer ends of arms 60 extending outwardly from a sleeve 61 located intermediate the hubs 49a and 49b and encircling the sleeve 49. The function of this trimming knife is to shear off the protruding ends c of the sticks of crayons C preliminary to the expulsion of the crayons from their molds. As has already been explained, the crayons are ejected by the plungers progressively in a step-by-step movement so that the position of the knife determines the length of the tips trimmed from the crayons, and hence the length of the crayons remaining in the molds. The position of the knife is determined by generally the same kind of adjusting means as those already described for setting the position of the shoe 43. As best shown in Fig. 10, a worm 62 is rotatably supported in a pair of lugs 63 extending up from a collar 64 secured to sleeve 49. To the end of this worm is secured a bevel gear 65 which meshes with a companion bevel gear 66 upon the end of a stub shaft 67 rotatably supported in a bearing 68 extending up from the collar 64. Thus, by coupling a hand-crank to the squared end of stub shaft 67, the worm 62 may be rotated. This worm engages a worm wheel 69 which, in turn, is secured to an end of sleeve 61 whereby this sleeve, carrying the knife-supporting arms 60, is rotated upon supporting sleeve 49 to swing the knife to different angular positions about the inner circumference of the mold carrier.

In order to function to best advantage the trimming knife 58 should be maintained at the proper cutting angle with respect to the work and free from any appreciable play. For this purpose there is secured upon each of the arms 60 a bracket 70, as best shown in Figs. 12 and 13. This bracket rotatably supports one end of a pair of horizontally disposed countershafts 71 and 71a (Fig. 11) extending in parallel between the brackets on the two arms and carrying adjacent one of their ends intermeshing pinions 72 and 72a. Mounted upon countershaft 71 is a bevel gear 73 engaging a companion bevel gear 74 secured to the end of a worm 75 also rotatably mounted in the bracket 70. Worm 75 engages a worm wheel 76 fixed to a shaft 77 disposed parallel to and above the countershafts 71 and 71a, the shaft 77 being mounted for rocking movement in the ends of the knife supporting arms 60. Similarly shaft 71a is provided with bevel gear 73a, meshing with a companion bevel gear 74a secured to the end of a worm 75a, this gearing corresponding in all essential respects to the gearing previously described located at the opposite end of the countershaft 71. Worm 75a likewise meshes with a worm wheel 76a secured to the end of shaft 77 opposite from that which carries the worm wheel 76. Rigidly connected to the shaft 77 is the carrier bar 59 to which the trimming knife 58 is fastened. By engaging a hand crank K' (indicated in dotted lines in Fig. 1) with the squared end of either of the countershafts 71 or 71a any rotation imparted thereto will be transmitted to the other shaft through the intermeshing pinions 72 and 72a, and from each of these countershafts through the gearing previously described to opposite ends of the shaft 77, thus rotating this last-mentioned shaft and the knife carrier bar supported thereon to swing the knife into (or out of) operative cutting position. In order to apply tension to the knife blade, the pinion 72a is arranged so that it may be slid outwardly along shaft 71a out of mesh with the pinion 72; then after applying the crank to shaft 71 to take up play the pinion 72a may be slipped back into engagement with the pinion 72. This takes up any backlash between the gear teeth such as might cause the knife to wobble or vibrate during operation of the machine.

Supported at its upper end upon the carrier bar 59 adjacent the cutting edge of the trimming knife and extending downwardly over the sleeve 61, is a chute 78. The lower end of this chute terminates adjacent the upper end of a vertically disposed hopper 79 (Fig. 8) supported by a bracket 80 projecting up from a conveyor frame 81a so as to overlie a horizontal conveyor belt 81. One end of this conveyor belt winds over a roller 82 rotatably supported in a forked bracket 83 depending from a collar 84 encircling sleeve 49. The conveyor belt is driven by means not shown so as to travel in the direction indicated by the arrows in Fig. 1, and serves to remove the pieces of crayon c cropped off by the trimming knife 58, these pieces sliding down the chute 78 into the hopper 79 from which they are directed upon the upper run of the conveyor belt. The conveyor belt leads out through the open end of the mold carrier and removes the crayon croppings to a position of discharge clear of the machine.

A second chute 85 supported on a bracket 86 extending up from the conveyor frame 81a slopes downwardly to a position adjacent the conveyor belt and serves to direct the completed sticks of crayon C ejected from the mold onto the side of the belt opposite to that which receives the crayon tips c.

The operation of the rotary crayon molding machine described above is as follows:

Molten wax from which the crayons are to be molded is forced under slight pressure into the supply chamber W provided by the hollow shoe 43 by way of the wax supply pipe 44, the wax while flowing through this pipe and while in the supply chamber being maintained hot and in a fluid condition by the circulation of steam through the steam circulating pipes 45 and 45a.

As the mold carrier rotates, each longitudinal row of molds passes sequentially into communication with the supply chamber during the period when the plungers 9 are being retracted, allowing the molten wax to be charged into the molds. The shoe is preferably adjusted to the position shown in Fig. 2 so that the supply chamber will be in communication with a longitudinal series of molds during the complete retracting stroke of the plungers, (that is, throughout the whole interval that a follower bar 3 is acted upon by the portion D of the cam tracks 25). Hence the molds will be completely filled, and the molds will be free from air at the beginning of the filling operation so as to preclude the formation of bubbles or voids in the finished crayons.

As the mold carrier continues to rotate with the follower bar engaging the concentric portion A of the cam tracks, the wax within the molds will cool and solidify, this action being accelerated by the cooling water flowing through the passageways 6 and 6a and around the molds. In time, the mold carrier will arrive at a position in which the follower bar supporting the row of plungers moves into engagement with the stepped portion B of the cam tracks, at which time these plungers will be intermittently moved inwardly to project the crayons from the molds in a step-by-step movement until eventually the crayons will have been completely pushed from their molds. By rotating the stub shaft 67, the sleeve 61 carrying the knife supporting arms 60 is rocked, through the intermediary of the gearing described in connection with Fig. 10, to adjust the position of the trimming knife circumferentially of the mold carrier. This knife performs two functions: First, it squares off one end of the crayons and, second, according to the amount of the crayon removed, it determines the length of the finished crayon sticks. Thus, by suitably positioning the knife with respect to any one of the dwell portions of the cam tracks within the range B, the length of the crayon sticks finally ejected from the molds is accurately determined. In Fig. 2 the knife is set for producing crayons of maximum length, only a tip of the crayons being removed; however, by moving the knife to the left, a greater length of crayon would be exposed to the knife, and hence crayons of shorter length would result.

These wax croppings or trimmings c slide down the chute 78 into the hopper 79 where they are removed on the conveyor belt 81 for remelting. The finished crayons C finally ejected from the molds slide down the chute 85 onto the conveyor belt 81 and are carried out the open end of the mold carrier to a suitably located unloading station.

For any fixed position of the cams 2 and 2a, the stepped contour of the cam tracks allows for the production of only a relatively few selected lengths of crayons, depending upon the adjustment of the trimming knife. In order to meet the demands of the trade, however, it is desirable that crayons should be made accurately to any desired length, within reasonable limits. For accomplishing this object, the cam tracks 25 of the cams are disposed on a slope, as has already been explained in connection with Fig. 4, so that by uniformly and simultaneously adjusting both cams toward or from each other, the rollers 24 supporting the ends of the follower bars are caused to engage lower or higher points upon the sloping cam tracks. For example, when the cams are moved closer together by rotating the operating bar 39, the rollers contact lower points transversely of the tracks and hence, during rotation of the mold carrier, they follow a path of smaller diameter. As a consequence, the plungers connected to the follower bars repeat the same pattern or sequence of operations although their working range is altered with reference to a fixed point upon their molds. Otherwise stated, when the cams are moved closer to each other a greater length of crayon is caused to be projected from the molds during the period in which the rollers 24 engaged the stepped portion B of the cam tracks. Thus, the machine is capable of producing crayons of any desired lengths within its maximum limits without requiring more than a few simple adjustments.

In changing the position of the shoe 43, the blocks 47 pivotally supporting opposite ends of the shoe are retracted along the guide legs 48 by means of the screws 52 which are rotated by turning the shafts 54 and 54a. After the shoe has been rocked to its new position, it is once more tightened against the inner circumference of the mold carrier by means of the rods 54 and 54a. Because these rods are operatively connected to different ends of the shoe, it is possible to obtain tighter fit of the shoe against the mold rings.

By constructing the mold carrier of a series of rings assembled in interfitting relation, economy of manufacture and greater convenience of shipment and assembly is achieved. While the invention has been described, by way of example, in connection with a crayon molding machine, it is to be understood that the invention may be embodied in other types of machines for continuously molding objects from plastic materials.

Obviously various other changes in form, construction and arrangement and combination of the several parts of my rotary molding machine may be made and substituted for those herein shown and described without departing from the nature and principle of my invention.

I claim:

1. A machine for molding plastic materials comprising an annular mold carrier, a series of open-ended tubular molds radially mounted upon said carrier for rotation therewith, a stationary filling chamber located adjacent the carrier and adapted to be placed successively in communication with the molds during rotation of the carrier, plungers reciprocable within said molds, means for moving the plungers radially of the carrier in a step-by-step movement for projecting the solidified sticks of material from the open ends of the molds, means located adjacent said molds for removing the projecting portions of the sticks, and means for circumferentially adjusting the position of said removing means about the carrier.

2. A machine for molding plastic materials comprising an annular mold carrier, a series of open-ended tubular molds radially mounted upon said carrier for rotation therewith, a stationary filling chamber located adjacent the carrier and adapted to be placed successively in communication with the molds during rotation of the carrier, plungers reciprocable within said molds, means for moving the plungers radially of the carrier in a step-by-step movement for projecting the solidified sticks of material from the open ends of the molds, a knife located adjacent said molds for trimming off projecting portions of the sticks and means for circumferentially adjusting the position of said knife and of said filling chamber about said carrier.

3. A machine for molding plastic materials comprising an annular mold carrier, a series of open-ended tubular molds radially mounted upon said carrier for rotation therewith, a stationary filling chamber located adjacent the carrier and adapted to be placed successively in communication with the molds during rotation of the carrier, plungers reciprocable within said molds, means for moving the plungers radially of the carrier in a step-by-step movement for projecting the solidified sticks of material from the open ends of the molds, a knife located adjacent said molds for shearing off the projecting portions of the sticks, means for circumferentially adjusting the position of said knife about the carrier and means for cooling said molds during rotation of said carrier.

4. A machine for molding plastic materials comprising an annular mold carrier, a series of open-ended tubular molds radially mounted upon said carrier for rotation therewith, a stationary filling chamber located adjacent the carrier and adapted to be placed successively in communication with the molds during rotation of the carrier, plungers reciprocable within said molds, means for moving the plungers radially of the carrier in a step-by-step movement for projecting the solidified sticks of material from the open ends of the molds, a knife located adjacent said molds for trimming off projecting portions of the sticks, means for circumferentially adjusting the position of said knife about the carrier and means for heating the filling chamber to maintain the material therein in fluid condition.

5. A machine for molding plastic materials comprising an annular mold carrier, a series of open-ended tubular molds radially mounted upon said carrier for rotation therewith, a stationary filling chamber located adjacent the carrier and adapted to be placed successively in communication with the molds during rotation of the carrier, plungers reciprocable within said molds, means for moving the plungers radially of the carrier in a step-by-step movement for projecting the solidified sticks of material from the open ends of the molds, and a knife located adjacent said molds for shearing off portions of the projecting sticks, means for circumferentially adjusting the position of said knife about the carrier, said filling chamber being located interiorly of the carrier and having sliding engagement with the molds.

6. A machine for molding plastic materials comprising an annular mold carrier, a series of open-ended tubular molds radially mounted upon said carrier for rotation therewith, a stationary filling chamber located adjacent the carrier and adapted to be placed successively in communication with the molds during rotation of the carrier, plungers reciprocable within said molds, means for moving the plungers radially of the carrier in a step-by-step movement for projecting the solidified sticks of material from the open ends of the molds, and a knife located adjacent said molds for trimming off projecting portions of the sticks, means for circumferentially adjusting the position of said knife about the carrier, said plunger-moving means comprising a cam arranged adjacent the carrier and presenting a stepped contour and followers operatively connected to the plungers and engaging said cam.

7. A machine for molding plastic materials comprising an annular mold carrier, a series of open-ended tubular molds radially mounted upon said carrier for rotation therewith, a stationary filling chamber located adjacent the carrier and adapted to be placed successively in communication with the molds during rotation of the carrier, plungers reciprocable within said molds, means for moving the plungers radially of the carrier in a step-by-step movement for projecting the solidified sticks of material from the open ends of the molds, and a knife located adjacent said molds for shearing off projecting portions of the sticks, means for circumferentially adjusting said knife about the carrier, said plunger-moving means comprising a pair of stationary track cams disposed parallel to the plane of rotation of the carrier, the tracks of said cams presenting stepped contours, and followers extending between and engaging said tracks, said followers being operatively connected to said plungers.

8. A machine for molding plastic materials comprising an annular mold carrier, a series of open-ended tubular molds radially mounted upon said carrier for rotation therewith, a stationary filling chamber located adjacent the carrier and adapted to be placed successively in communication with the molds during rotation of the carrier, plungers reciprocable within said molds, means for moving the plungers radially of the carrier in a step-by-step movement for projecting the solidified sticks of material from the open ends of the molds, and a knife located adjacent said molds for shearing off projecting portions of the sticks, means for circumferentially adjusting said knife about the carrier, said plunger-moving means comprising a pair of stationary track cams disposed parallel to the plane of rotation of the carrier, said cams having tracks of corresponding stepped contours and said tracks each being transversely inclined, followers extending between and engaging said tracks, said followers being operatively connected to said plungers, and means for laterally shifting said cams for causing the follower to engage higher or lower points upon the cam tracks.

9. A machine for molding plastic materials comprising an annular mold carrier, a series of open-ended tubular molds radially mounted upon said carrier for rotation therewith, a stationary filling chamber located adjacent the carrier and adapted to be placed successively in communication with the molds during rotation of the carrier, plungers reciprocable within said molds, cam means for retracting the plungers radially of the carrier while the filling chamber is in communication with the molds and for subsequently advancing said plungers radially of the carrier in a step-by-step movement when the filling chamber is out of communication with said molds for projecting the solidified sticks from the open ends of said molds, a knife located adjacent said molds for shearing off the projecting portions of the sticks, and means for individually adjusting the position of said knife and said filling chamber about the carrier.

10. A machine for molding plastic materials comprising a mold carrier composed of a series of individual mold rings assembled side-by-side in the form of a cylinder arranged for rotation about a horizontal axis, means for rotating said mold carrier, a series of molds radially mounted upon said mold rings for rotation therewith, a stationary filling chamber for introducing plastic material into said molds and means for ejecting the hardened material from the molds.

11. A machine for molding plastic materials comprising a cylindrical carrier composed of a series of individual mold rings arranged in laterally-abutting interfitting engagement and supported for rotation about a horizontal axis, means for rotating said mold carrier about a horizontal axis, a series of molds radially mounted upon said mold rings for rotation therewith, said mold rings being transversely recessed and together providing passageways extending longitudinally through the mold carrier and about the molds, manifold pipes mounted on the mold carrier for directing cooling water into and out of said passageways, a stationary filling chamber for introducing plastic materials into the molds and means for ejecting the hardened material from the molds.

12. A machine for molding plastic materials comprising an annular mold carrier, a series of open-ended tubular molds radially mounted upon said carrier for rotation therewith, a stationary filling chamber located adjacent the carrier and adapted to be placed successively in communication with the molds during rotation of the carrier, plungers reciprocable within said molds, cam means for retracting the plungers radially of the carrier while the filling chamber is in communication with the molds and for subsequently advancing said plungers radially of the carrier in a step-by-step movement when the filling chamber is out of communication with said molds for projecting the solidified sticks from the open ends of said molds, a knife located adjacent said molds for shearing off the projecting portions of the sticks, a wax supply pipe extending through one end of the mold carrier and communicating with the filling chamber for feeding molten wax thereto, and a steam circulating pipe having its inlet and outlet sections extending through an end of the mold carrier and traversing the filling chamber, the inlet section of said steam circulating pipe being disposed interiorly of said wax supply pipe.

13. A machine for molding plastic materials comprising an annular mold carrier, a series of open-ended molds radially mounted upon said carrier for rotation therewith, a stationary filling chamber located against the carrier and adapted to be placed successively in communication with the molds during rotation of the carrier, plungers reciprocable within said molds, means for moving the plungers radially of the carrier in a step-by-step movement for projecting the solidified material from the open ends of the molds, means located adjacent said molds for removing the projecting portions of the material, and means for circumferentially adjusting the position of said material removing means about the carrier.

14. A machine for molding plastic materials comprising an annular mold carrier, a series of open-ended tubular molds radially mounted upon said carrier for rotation therewith, a stationary filling chamber located adjacent the carrier and adapted to be placed successively in communication with the molds during rotation of the carrier, plungers reciprocable within said molds, means for moving the plungers radially of the carrier in a step-by-step movement for projecting the solidified sticks of material from the open ends of the molds, and a knife located in stationary position adjacent said molds for shearing off projecting portions of the sticks, means for adjusting said plunger-moving means comprising a pair of stationary track cams disposed parallel to the plane of rotation of the carrier, said cams having tracks of corresponding stepped contours and said tracks each being transversely inclined in reverse directions, followers extending between and engaging said tracks, said followers being operatively connected to said plungers, and means for causing the follower to engage higher or lower points upon the cam tracks.

JOHN W. NEFF.